United States Patent [19]

Ng

[11] 4,070,052
[45] Jan. 24, 1978

[54] RESILIENT VEHICLE BUMPER

[76] Inventor: Chun Wing Ng, 12,262 Clement Ader St., Riviere des Prairies, Canada, HIE IXI

[21] Appl. No.: 742,527

[22] Filed: Nov. 15, 1976

[51] Int. Cl.² .............................................. B60R 19/08
[52] U.S. Cl. ................................................. 293/71 R
[58] Field of Search .................. 293/71 R, 71 P, 70, 293/68, 60, 63, 1, 98, 69 R; 114/219

[56] References Cited

U.S. PATENT DOCUMENTS

| | | | |
|---|---|---|---|
| 3,747,915 | 7/1973 | Hall | 293/70 X |
| 3,841,683 | 10/1974 | Toro | 293/71 P X |
| 3,869,167 | 3/1975 | Muller | 293/70 X |
| 3,871,636 | 3/1975 | Boyle | 293/60 X |

FOREIGN PATENT DOCUMENTS 2,137,176  2/1973  Germany ........................... 293/71 R

*Primary Examiner*—Barry L. Kelmachter

[57] ABSTRACT

A resilient or shock-absorbing bumper for vehicle, which bumper is characterized by its simple, low cost and compact construction, and by being free of movable mechanical parts, and, consequently, which does not need any maintenance to preserve its operativeness. This resilient vehicle bumper includes an elongated rigid channel member of U-shape transverse cross-section defining an open side and an opposite side securable to a vehicle, an elongated rubber membrane mounted in the channel member, projecting from the open side thereof, and having transverse internal partitions dividing the membrane into a series of closed cells serially arranged along the channel member, and sand filling alternate cells, while the other cells are empty to allow lateral bulging of the sand-filled cells in the empty cells upon impact against the rubber membrane. Reinforcing bars are embedded longitudinally in the front portion of the rubber membrane.

5 Claims, 3 Drawing Figures

RESILIENT VEHICLE BUMPER

This invention relates to a bumper for a vehicle and, more particularly, to a vehicle bumper of the resilient or shock-absorbing type.

This invention defines a resilient vehicle bumper which is of simple construction, low cost and compact and which is free or movable mechanical parts and, consequently, which does not need any maintenance to preserve its operative against rust, corrosion and jamming.

Essentially, this resilient vehicle bumper includes a rubber membrane forming closed cells serially arranged along the bumper and sand-filling a plurality of these cells with intermediate cells being empty for lateral bulging of the sand-filled cells in the empty intermediate cells upon impact against the membrane.

The above and other objects and advantages of the present invention will be better understood with reference to the following detailed description of a preferred embodiment thereof which is illustrated, by way of example, in the accompanying drawings, wherein.

Figure 1:
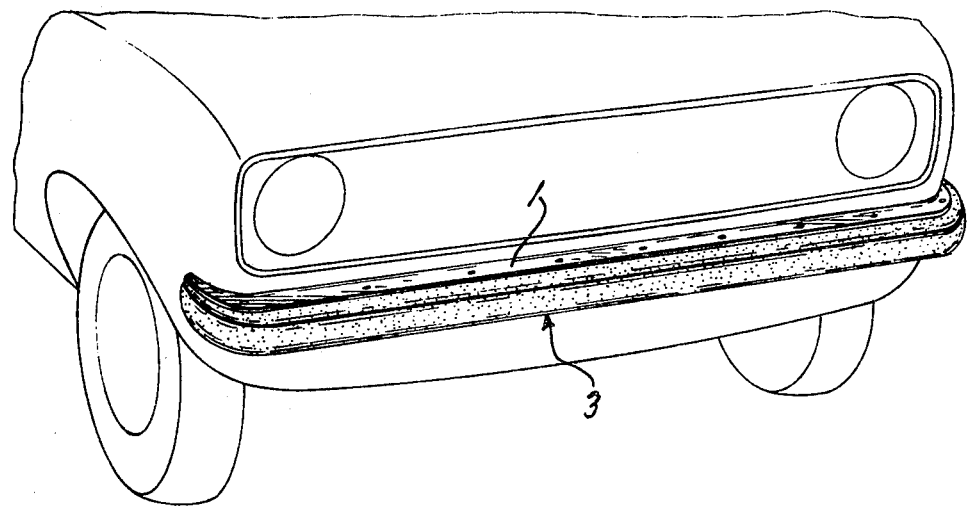
FIG. 1 is a perspective view of the front of a vehicle provided with a resilient bumper according to the present invention.
Figure 2:
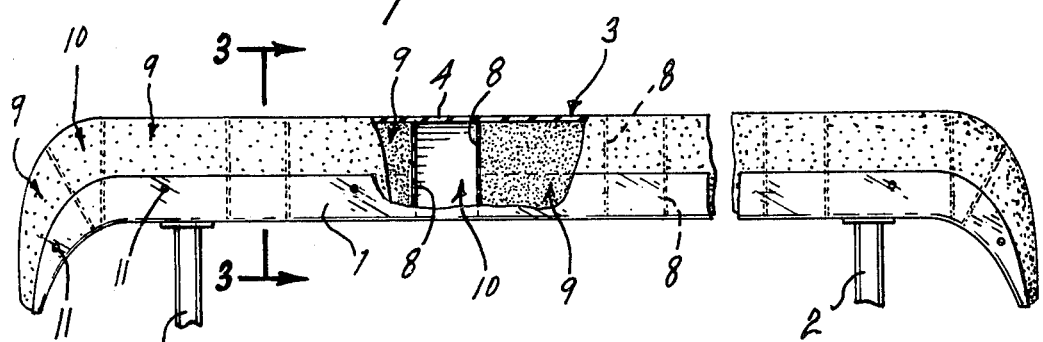
FIG. 2 is a top view of the resilient vehicle bumper of FIG. 1.
Figure 3:
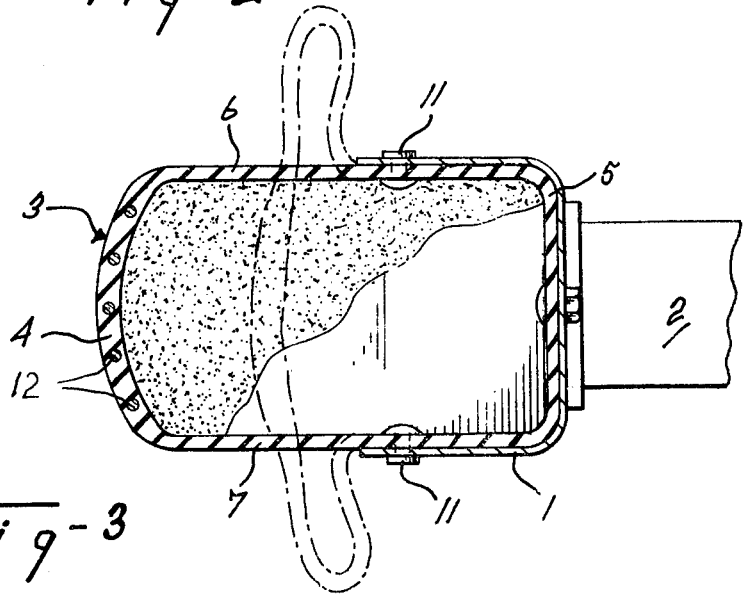
FIG. 3 is a transverse cross-section of the same bumper as seen along line 3—3 in FIG. 2.

Illustrated resilient vehicle bumper includes an elongated rigid channel member 1, of U-shape cross-section, defining an open side. The opposite side of the channel member 1 is bolted to a pair of carrying bars 2 fixed to the frame of the vehicle.

An elongated rubber membrane 3 is mounted in the channel member 1, extends lengthwise co-extensive with the latter, and laterally projects from the open side of the channel member. The rubber membrane 3 is fully closed defining a front portion 4, a rear portion 5, a top 6 and a bottom 7. The membrane 3 includes internal partitions 8 extending transversely of the membrane and dividing the latter into a series of closed cells 9 and 10.

The plurality of cells 9 alternate with the intermediate cells 10 and are filled with sand, while the intermediate cells are empty. Thus, upon impact against the external portion of the membrane 3, the alternate cells 9 laterally bulge in the intermediate cells 10. The small impacts, or shocks, may thus be absorbed by energy dispersion in the sand and by the membrane 3.

The membrane 3 is fixed to the channel member 1 by pins 11 extending upright through the channel member and the top 6 and bottom 7 of the membrane.

The front portion 4 of the membrane is provided with reinforcing rods, or cables 12, extending longitudinally of the membrane 3 and channel member 1.

I claim:

1. A resilient vehicle bumper comprising a rigid channel member of U shape transverse cross section, defining an open side and an opposite side securable to a vehicle body, a resilient membrane mounted in said channel member, projecting from said open side thereof, and integrally forming a series of closed cells serially arranged along said channel member, and including at least one filled call and at least one empty cell, granular material filling each filled cell, and each filled cell being adjacent to said at least one empty cell on at least one side for lateral bulging of each said filled cell into each adjacent empty cell upon impact against the resilient membrane.

2. A resilient vehicle bumper as defined in claim 1, wherein said granular material fills a plurality of alternate cells, a plurality of intermediate cells formed between said alternate cells, the intermediate cells forming a plurality of empty cells for lateral bulging of the alternate filled cells into the intermediate empty cells upon impact against the resilient membrane.

3. A resilient vehicle bumper as defined in claim 2, wherein said membrane includes partitions separating hard alternate cells and said intermediate cells and extending transversely to said rigid channel member.

4. A resilient vehicle bumper as defined in claim 3, wherein said membrane includes an external elongated front portion extending longitudinally of said channel member and reinforcing cables embedded in said elongated front portion and extending lengthwise longitudinally thereof.

5. A resilient vehicle bumper as defined in claim 1, wherein said membrane includes an external elongated front portion extending longitudinally of said channel member and reinforcing cables embedded in said elongated front portion and extending lenthwise longitudinally thereof.

* * * * *